United States Patent
Schlicht (12)

(10) Patent No.: US 6,302,452 B1
(45) Date of Patent: Oct. 16, 2001

(54) PIPE CONNECTOR SYSTEM WITH INTERCHANGEABLE CONNECTOR ASSEMBLIES

(76) Inventor: Gunter Schlicht, 15 Briones View, Orinda, CA (US) 94563

( * ) Notice: Subject to any disclaimer, the term of this patent is extended or adjusted under 35 U.S.C. 154(b) by 0 days.

(21) Appl. No.: 09/354,384

(22) Filed: Jul. 14, 1999

(51) Int. Cl.⁷ .............. F16L 17/00; F16L 19/00; F16L 21/02
(52) U.S. Cl. .............. 285/363; 285/368; 285/412
(58) Field of Search .................. 285/363, 364, 285/365, 368, 407, 410, 412

(56) References Cited

U.S. PATENT DOCUMENTS

| | | | |
|---|---|---|---|
| 3,398,978 | * 8/1968 | Gasche | 285/368 X |
| 4,432,572 | * 2/1984 | Thalmann | 285/368 X |
| 4,458,924 | 7/1984 | Schlicht . | |
| 5,413,389 | 5/1995 | Schlicht . | |
| 5,755,466 | * 5/1998 | Harth | 285/412 |
| 5,967,566 | 10/1999 | Schlicht . | |

* cited by examiner

*Primary Examiner*—Neill Wilson
(74) *Attorney, Agent, or Firm*—Richard Esty Peterson

(57) ABSTRACT

A pipe connector system for connecting stub end pipe particularly thermoplastic pipe, the pipe connector system using a common engagement ring and either a flange connector system or a shell-type coupling connector system to interconnect two segments of stub end pipe or to connect stub end pipe to a pipe fitting, the alternate connector systems allowing flexibility and versatility depending on the situation, the common engagement ring being formed as either a full ring or split ring, the split ring permitting the connector system to be utilized when the pipe has a stub end pre-installed.

9 Claims, 3 Drawing Sheets

PIPE CONNECTOR SYSTEM WITH INTERCHANGEABLE CONNECTOR ASSEMBLIES

BACKGROUND OF THE INVENTION

This invention relates to a pipe connector system that is particularly adapted for the field connection of pipe, particularly thermo plastic pipe. The pipe connector system includes an engagement ring for a stub-end pipe and the alternate use of a removable convoluted flange assembly or a removable shell-type, coupling for interconnecting pipe segments. The interchangeable flange assembly or coupling allows the pipe connector system of this invention to be used in conventional piping systems. The adaptability and flexibility provided by the interchangeable flange system or coupling system makes the combined system ideally suited where alterations in the piping system are inevitable, or where alternatives are required for different situations.

For example, in the mining industry, thermal plastic pipe is used to convey particulate matter pneumatically or in a liquid slurry. In addition to frequent rerouting of the transport system, the piping is subject to wear from the abrasive material transported. To maximize usage of the thermal plastic pipe, segments of the pipe might be removed and replaced. A system that allows flexibility in the field replacement of pipe has great advantages in returning the system to operation.

As a further example, certain situations may require the use of a shell-type coupling, where the connecting bolts of a flange assembly are not accessible. Additionally, a flange connector may be required to connect a pipe segment to a flanged fitting such as a value. A system having readily available alternatives is therefore desired, particularly in pipe systems that are temporary or subject to alteration.

The pipe connectors of this invention include an engagement ring that engages the stub-end of a pipe to seat the alternate interconnectors. The engagement ring is designed to restrain cold flow of material in the end stub to insure a seal is maintained. The common configuration of the engagement ring enables either the coupling or the flange assembly to interconnect the piping. Additionally, the engagement ring is formed as either a full-ring or a split-ring depending on the connector used and the requirements of the interconnection process.

For example, where a pipe segment has a stub end pre-installed, a split ring is required for utilization of the interconnectors. However, where a stub end is being installed, a full ring can be slipped over the pipe end, with a flange if desired, before installation of the stub end. In thermoplastic pipe, a stub end can be thermally coupled to the pipe end by thermocoupling equipment. This procedure can easily be performed in the field and is one of the factors that makes thermoplastic piping desirable for many industrial, agricultural and material moving processes.

The use of light-weight, convoluted flange assemblies which can be cast from aluminum or ductile iron, is advantageous for savings in transport, storage and installation costs. Similarly, the cast aluminum or ductile iron coupling assemblies are designed and configured to minimize weight for the design strength of the coupling. The flange assemblies and coupling assemblies can be fabricated from other materials such as stainless steel or polymer encapsulated steel for specialty situations.

SUMMARY OF THE INVENTION

The pipe connector system of this invention includes an interchangeable flange assembly or coupling for interconnecting pipe having a stub end. The pipe connector system is particularly adapted for the interconnection of HDPE (thermo plastic) pipe. The flange connector and coupling connector each use a common engagement ring. The engagement ring may be a full or split ring that forms a contact collar between the connector and the stub. The use of the split ring is particularly advantageous when the thermo plastic pipe is fitted with a stub end at the time of installing the flange connectors. Although the flange connectors can be utilized with a full engagement ring, once installed, the stub end must be cut to allow removal of the engagement ring and flange connectors. By use of the split ring, the flange connectors and the split ring can be removed from the thermo plastic pipe without removing the stub end. When either a full ring or split ring is used with the coupling connectors, the coupling connectors can be removed without removal of the stub end of the pipe.

The flange connectors in the flange assembly comprise convoluted flange members that are designed to transmit coupling forces through the engagement ring to the gasket face of the stub at the end of the thermal plastic piping. Similarly, the coupling connectors are designed to interconnect in clamshell fashion and transmit the coupling forces through the engagement ring to the gasket face of the end stub. This is accomplished by the chamfered contact faces of the connectors and the engagement rings, which develop vectors of the force of interconnection developed by the coupling bolts that include opposed forces longitudinal to the pipe and normal to the gasket face, and inwardly radial forces that oppose fluid developed forces within the piping at the stub end.

DETAILED DESCRIPTION OF THE PREFERRED EMBODIMENTS

Figure 1:
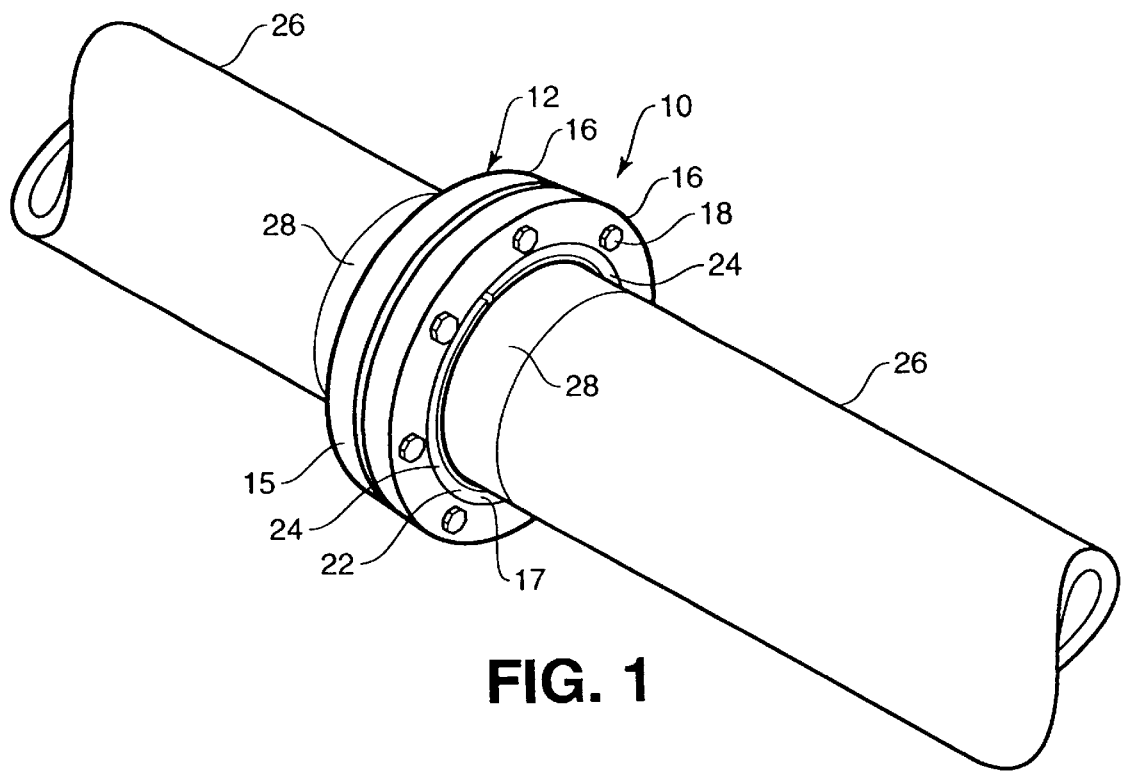
FIG. 1 is a prospective view of a flange connector system installed on a segment of thermal plastic piping.

Referring to FIG. 1, the pipe connector system of this invention designated generally by the reference numeral 10 is shown with a flange connector system 12 installed on a thermo plastic pipe 14. The flange connector system 12 includes a flange assembly 15 with first and second flange members 16 interconnected by bolts 18. The flange members 16 engage engagement rings 17, that in this embodiment is in the form of a split ring unit 22. The split ring unit 22 includes a pair of semi-circular ring segments 24 for each flange member 16 to effect the connection of two segments 26 of the thermal plastic pipe 14. Each pipe segment 26 includes a stub end 28 that is thermo-coupled to the pipe segment 26.

Figure 2:
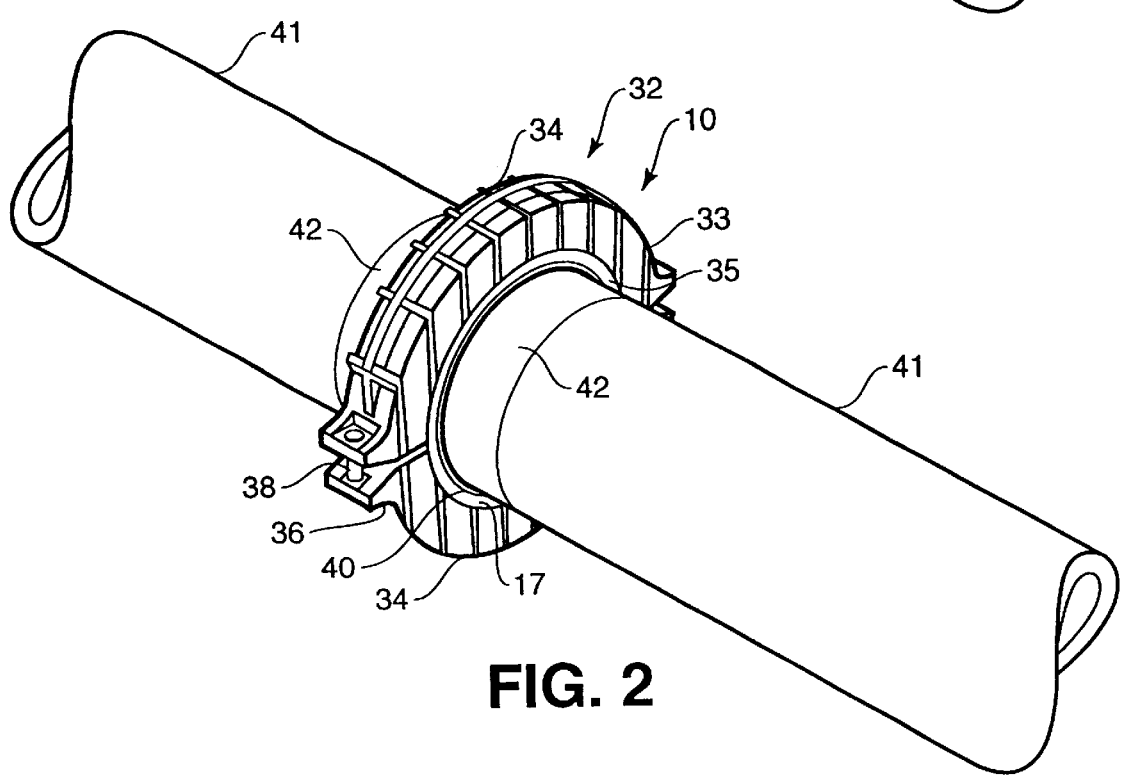
FIG. 2 is a prospective view of a coupling connector system on a segment of thermal plastic piping.

Referring to the pipe connector system 10 of FIG. 2, a coupling connector system 32 is shown. The coupling connector system 32 includes a coupling assembly 33 comprising a pair of coupling members 34 that are semi-circular or crescent-shaped in configuration. The coupling members 34 have projecting bolt carriages 36 through which are installed connecting bolts 38 for clamping the two coupling members 34 together around engagement rings 17, here a full ring unit 35. The full ring unit 35 comprises a pair of engagement rings 40 (one shown), which seat the coupling members 34 when interconnecting the pipe segments 41. The coupling connector system 32 engages the stub ends 42 at the end of pipe segments 41 in a manner similar to the split rings 22 of FIG. 1, as described in greater detail hereinafter.

Figure 3:
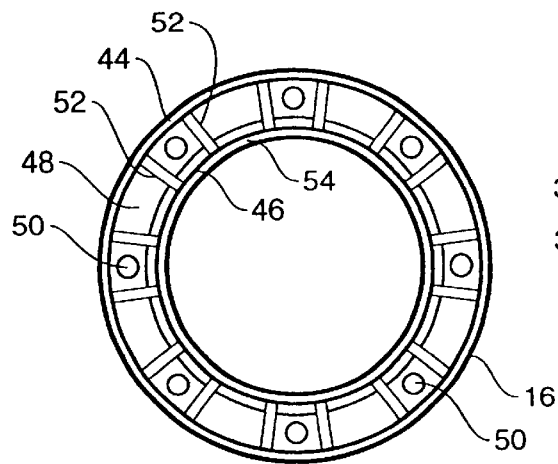
FIG. 3 is a back elevational view of one of the flange connectors in the coupling connector system.

Referring to FIG. 3, the elevational view of the backside of one of the flange members 16 is shown. The flange member 16 is of a convoluted type having an outer ring portion 44 an inner ring portion 46 and an intermediate web portion 48 interconnecting the inner ring portion 46 and the outer ring portion 44. The web portion 48 has a series of bolt holes 50 evenly spaced around the flange member. Adjacent each bolt hole 50 are rib members 52 which provide added strength to the light weight flange member in the larger sizes. The inner ring portion 46 has an incline or chamfered contact surface 54 that engages a complimentary incline or chamfered contact surface 56 on the engagement rings 17 as shown in FIGS. 5 and 6.

Figure 4:
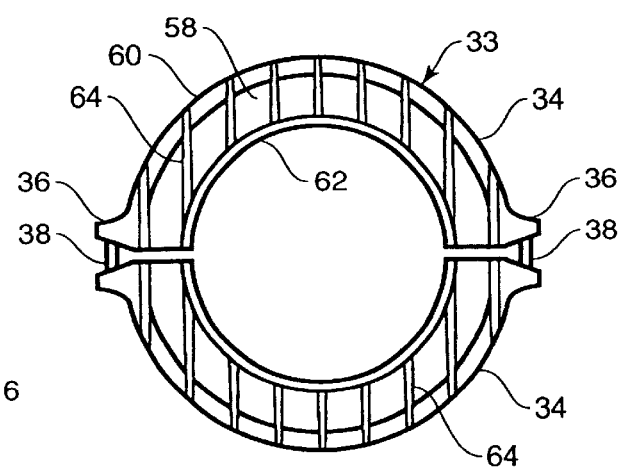
FIG. 4 is a side elevational view of the coupling connectors in the coupling connector system.

Referring to FIG. 4 an elevational view of the coupling assembly 33 of the coupling connector system is shown. The coupling assembly 33 has the two crescent-shaped coupling members 34 interconnected by carriage bolts 38 that are seated in projecting bolt carriages 36. The coupling members 34 have a shell-like housing 58 with a central perimeter ridge 60, spaced inner rims 62 and a series of ribs 64 between the perimeter ridge 60 and the inner rims 62. The ridge 60 and ribs 64 provide structural rigidity to the housing 58 to uniformly transmit the clamping forces of the bolts 38 to the engagement rings 17.

Figure 6:
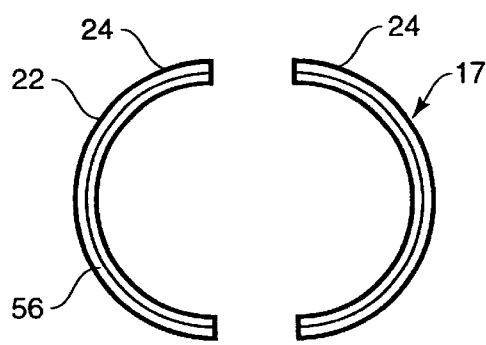
FIG. 6 is a side elevational view of a split engagement ring that forms part of the pipe connector system of this invention.
Figure 7:
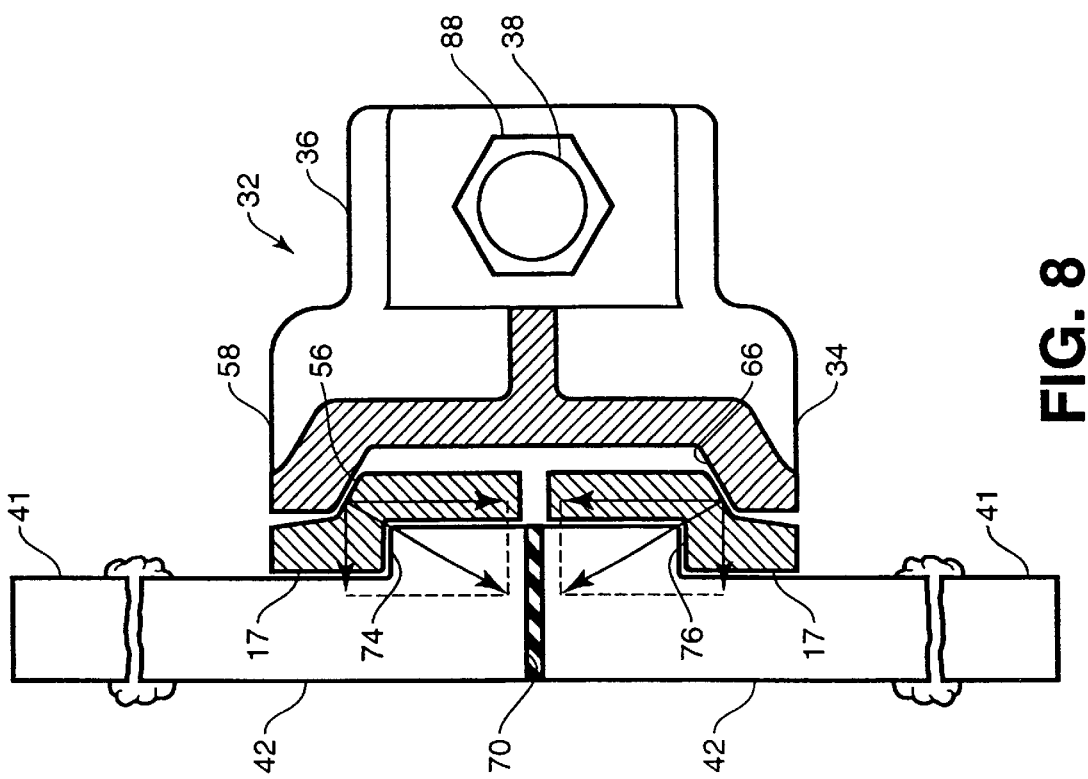
FIG. 7 is an enlarged partial cross sectional view of a segment of pipe with the flange connectors and split rings installed.
Figure 8:
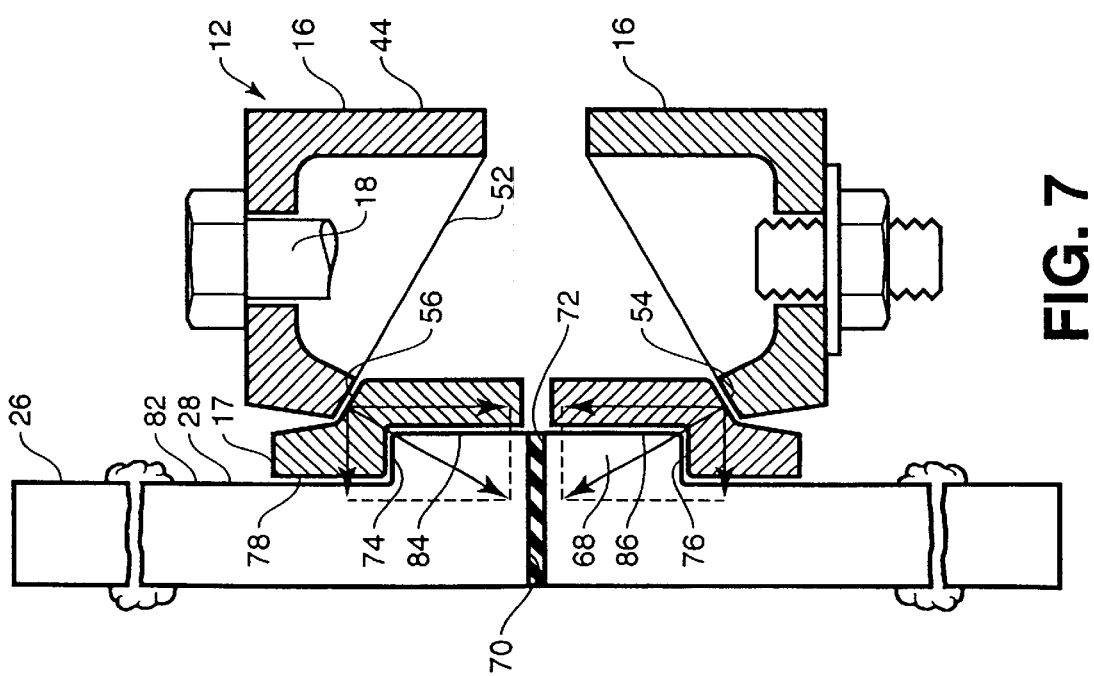
FIG. 8 is an enlarged partial cross sectional view of a segment of pipe and the coupling connectors and full rings installed.

The engagement rings 17 as noted are of two types that are interchangeable. The split ring unit 22 is shown in FIG. 6 and includes two identical semi-circular ring segments 24. The ring segments 24 have a generally "z" cross section with an incline or chamfered contact surface 56 that contacts a complimentary contact surface 54 on the inner ring portion 46 of the flange members 16, or a similar complimentary contact surface 66 on the inside of the inner rim 62 of the coupling members 34 as shown in FIGS. 7 and 8. The split ring unit 22 is typically used in pairs with a pair of flange members 16. A single unit 22 is used with a flange member 16, for example, when a stub end pipe segment is connected to a flanged fitting.

Figure 5:
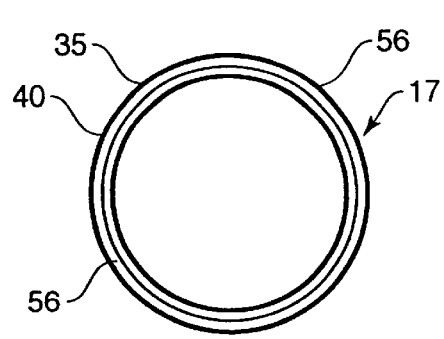
FIG. 5 is a side elevational view of a full engagement ring that forms part of the pipe connector system of this invention.

Alternately, the engagement rings 17 may comprise the full ring unit 35 shown in FIG. 5. The full ring unit 35 has a pair of rings 40 each with the same "z" cross section with the incline or chamfered contact surface 56. The ring unit 35 is ordinarily used in pairs with the flange assembly 15 or coupling assembly 33. The coupling assembly 33 requires the use of a pair of engagement rings 17, unless a fitting includes specially prepared coupler stub with an incline or chamfered contact surface matching the contact surface of the coupling members 34.

Referring to the flange connector system 12 of FIG. 7, the pipe segment 26 is shown thermally fused to a stub end 28.

The stub end 28 has an enlarged end stub 68 with a gasket face 70. A gasket 72 is interposed between the opposed stub ends 28 to seal the interconnection of the pipe segments 26. The end stub 68 has a shoulder 74 against which a complimentary contact face 76 on the engagement ring 17 is seated. The engagement ring 17 and flange member 16 are slipped over the pipe segment 26 before the stub end 28 is joined when the ring 17 is a full ring unit 35. A split ring unit 22 can be installed after the stub end 28 is attached and is the usual ring unit used with the flange members 16. The engagement ring 17 has a first inner cylindrical contact surface 78 sized to slip over the outside of the pipe segment 26 and neck 82 of the stub end 28, and a second inner contact surface 84 sized to engage the outer perimeter 86 of the stub 68.

When the flange members 16 engage the engagement rings 17 by the incline contact surfaces 54 seating on the incline contact surfaces 56 of the engagement rings 17, the coupling forces developed by the bolts 18 on tightening are transmitted to the stub end 28 as shown in the superimposed vector diagram in FIG. 7.

In a similar manner, the engagement rings 17 in the coupling connector system 32 of FIG. 8 encompass the stub ends 42 of the segments 41. The contact face 76 on the engagement rings 17 contacts the shoulder 74 of the stubs 68 to transmit the coupling forces of the coupling members 34 (one shown). The coupling member 34 shown, has opposed inclined contact surfaces 66 in the housing 58, which seat on the inclined contact surface 56 of the rings 17. The superimposed vector diagram in FIG. 8 illustrates the manner in which the clamping forces of the connecting bolts 38 are transmitted to the opposed gasket faces 70 through the stub end 42 on tightening the bolt nut 88. The engagement rings 17 described with reference to FIGS. 7 and 8 may be either split ring units 24 as shown in FIG. 6, full ring units 35 as shown in FIG. 5 or a mix of the two units depending on the circumstances involved in the installation.

The operability of either connector system on the common ring design provides a degree of flexibility that is particularly useful in systems subject to modification.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A pipe connector system for connecting stub end pipe having an end stub with a contact shoulder comprising:

an interchangeable flange connector system and coupling connector system wherein the flange connector system and coupling connector system utilize common engagement rings, wherein the flange connector system includes a pair of flange members, each flange member having an outer ring portion, an inner ring portion and a web portion interconnecting the outer ring portion and the inner ring portion, with the web portion having bolt holes and the inner ring portion having an incline contact surface;

wherein the coupling connector system has a pair of coupling members each having a crescent configuration with a shell-like housing having spaced inner rims with opposed inside, incline contact surfaces; and, wherein the engagement rings utilizable with the flange connector system and the coupling connector system have a contact face configured to engage the contact shoulder of the end stub of the stub end pipe and an incline contact surface contactable by the incline contact surface of the inner ring portion of the flange members and the incline contact surface of the coupling members when one of the flange members and coupling members is engaged with the engagement ring.

2. The pipe connector system of claim 1 wherein at least one of the common engagement rings for the flange connector system and coupling connector system comprises a split-ring with two semi-circular ring segments enabling use of the pipe connector system on the stub end pipe with the end stub pre-installed.

3. The pipe connector system of claim 1 wherein the coupling connector system includes a pair of engagement rings, wherein the coupling members engage the engagement rings when interconnecting stub end pipe.

4. The pipe connector system of claim 1 wherein the flange members have rib members between the outer ring portion and inner ring portion adjacent each bolt hole.

5. The pipe connector system of claim 1 wherein each coupling member of the coupling connector system has ends with bolt carriages for interconnecting the coupling members with bolts.

6. The pipe connector system of claim 5 including a pair of bolts interconnecting the ends of the coupling members.

7. The pipe connector system of claim 1 including a plurality of bolts interconnecting the flange members.

8. The pipe connector system of claim 1 wherein the shell-like housing includes a central perimeter ridge and a series of ribs between the perimeter ridge and the inner rims.

9. The pipe connector system of claim 1 wherein the end stub of the stub end pipe has a gasket face and the incline contact surface of each engagement ring and the incline contact surfaces of the flange members and coupling members are configured to direct coupling forces to the gasket face.

\* \* \* \* \*